Figure 1:
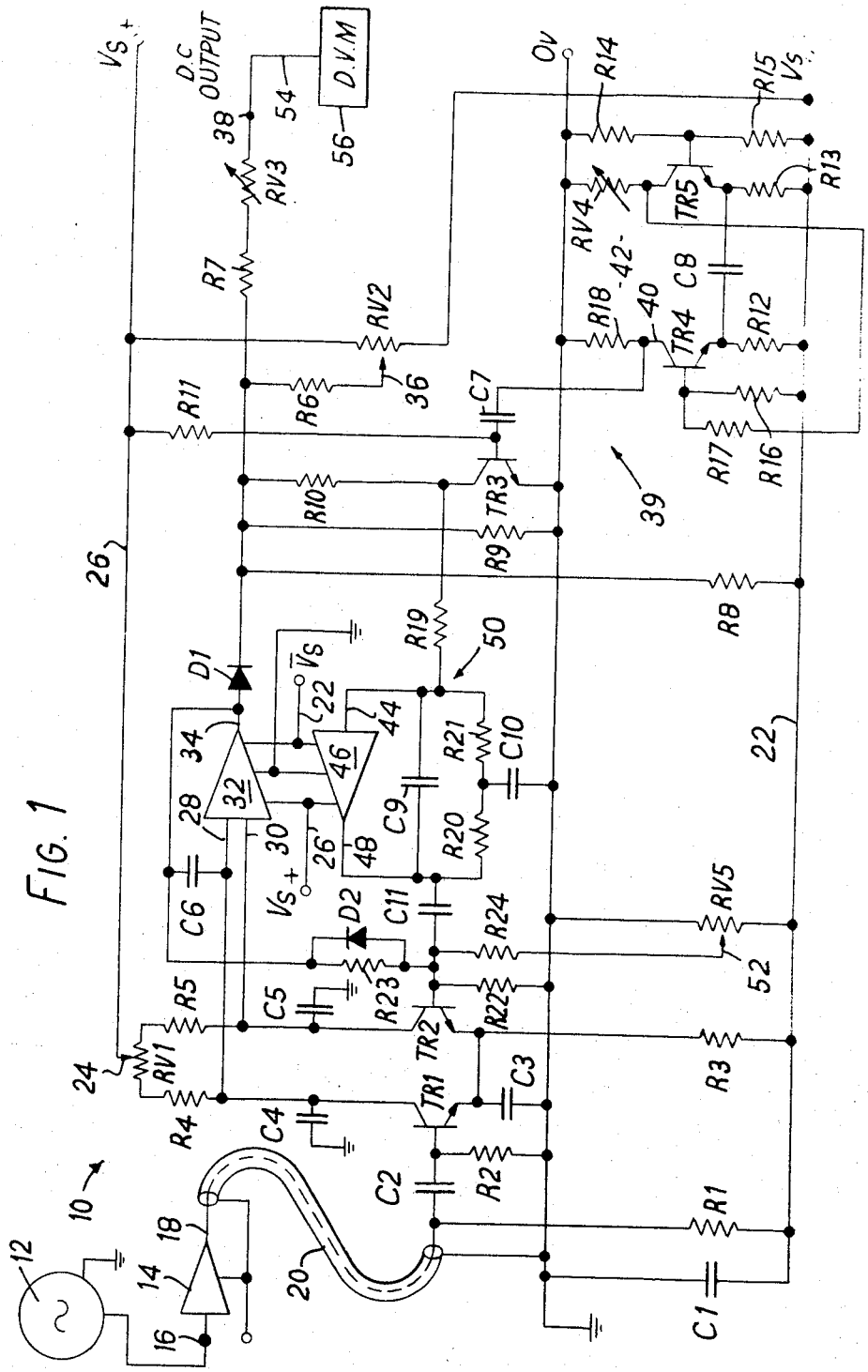

United States Patent [19]
Martin

[11] 3,772,582
[45] Nov. 13, 1973

[54] A.C. TO D.C. CONVERTER CIRCUITS

[75] Inventor: Edward Albert Martin, Fleet, England

[73] Assignee: The Solartron Electronic Group Limited, Farnborough, England

[22] Filed: July 26, 1972

[21] Appl. No.: 275,391

[30] Foreign Application Priority Data
July 27, 1971    Great Britain.................. 35,299/71

[52] U.S. Cl. ............................ 321/47, 321/18
[51] Int. Cl. ............................. H02m 7/00
[58] Field of Search .............. 321/8, 18, 9, 47; 324/119, 120

[56] References Cited
UNITED STATES PATENTS

| | | | |
|---|---|---|---|
| 3,473,122 | 10/1969 | Holt | 324/120 |
| 3,569,841 | 3/1971 | Richman | 324/119 X |
| 2,994,825 | 8/1961 | Anderson | 324/120 X |
| 3,491,252 | 1/1970 | Petrohilos | 321/8 X |
| 3,631,342 | 12/1971 | McDonald | 324/119 X |
| 3,636,430 | 1/1972 | Kernick et al. | 321/18 |
| 3,657,566 | 4/1972 | Holt | 321/8 X |

*Primary Examiner*—William M. Shoop, Jr.
*Attorney*—William R. Sherman et al.

[57] ABSTRACT

An A.C. to D.C. converter comprises two matched rectifiers, the first of which is connected to receive the A.C. input signal to be converted. The D.C. outputs of the two rectifiers are connected to the respective inputs of a differential amplifier, whose output is fed to a fixed-frequency chopper circuit. The output of the chopper circuit is filtered to render it sinusoidal, and then fed to the second rectifier. Since the rectifiers are matched, and receive respective inputs which are equal in amplitude and similar in waveform, the second rectifier compensates for the non-linear rectifying characteristics of the first, and the amplitude of the D.C. output of the differential amplifier is linearly related to the amplitude of the A.C. input signal.

9 Claims, 2 Drawing Figures

A.C. TO D.C. CONVERTER CIRCUITS

This invention relates to A.C. to D.C. converter circuits, and is particularly but not exclusively concerned with such a circuit for use in an instrument for measuring the voltage of a relatively small amplitude A.C. signal, typically a few millivolts, at a relatively high frequency, typically up to 300 MHz.

Known A.C. to D.C. converter circuits frequently employ a simple rectifying circuit followed by a D.C. amplifier. However, these circuits suffer from the disadvantage that the rectifying characteristics of the rectifying circuit are non-linear, particularly at low amplitudes, and temperature dependent. In an alternative known form of A.C. to D.C. converter circuit, a controlled-gain operational A.C. amplifier with one or more rectifiers in its feedback loop is used. This arrangement substantially reduces the effects of the characteristics of the rectifier or rectifiers, but suffers from the further disadvantage that it is very difficult to design an operational amplifier which will accurately maintain its desired uniform gain at frequencies up to 300 MHz.

According to the present invention, therefore, an A.C. to D.C. converter circuit for producing a D.C. output signal whose magnitude is dependent upon the amplitude of an A.C. input signal, comprises first rectifying means for rectifying the A.C. input signal, differential amplifier means having a first input connected to receive the rectified signal produced by the first rectifying means and arranged to produce the D.C. output signal, a chopper circuit connected to the output of the differential amplifier means, and second rectifying means, similar in its rectifying characteristics to the first rectifying means, connected to receive and rectify the chopped signal produced by the chopper circuit, the output of the second rectifying means being connected to a second input of the differential amplifier means, whereby to substantially compensate for the effects of the characteristics of the rectifying means and render the relationship between the amplitude of the A.C. input signal and the magnitude of the D.C. output signal substantially linear.

In a preferred embodiment of the invention, there is provided filter means connected between the chopper circuit and the second rectifying means and arranged to render the waveform of the chopped signal substantially similar to the waveform of the A.C. input signal. The filter means may comprise a tuned filter, such as a bridged-T filter, whose resonant frequency is substantially equal to the operating frequency of the chopper circuit. Alternatively and preferably, the filter means may comprise a low pass filter whose pass band extends to a frequency just above the operating frequency of the chopper circuit.

The chopper circuit preferably comprises a semiconductor switch driven at a predetermined fixed frequency, for example by an astable circuit.

The first and second rectifying circuits may respectively comprise first and second transistors having their emitters commoned and connected to a common reservoir capacitor, the respective rectified outputs of the rectifying circuits being taken from the respective collectors of the transistors.

There may be provided at least one diode arranged to limit the voltage supplied to the chopper circuit from the differential amplifier means, so as to prevent positive feedback around the loop including the chopper circuit and the second rectifying means. In this case, there may also be provided a biassing arrangement for producing a small offset in the d.c. output signal when the diode is reverse-biassed, whereby to indicate that the voltage supplied to the chopper circuit has been limited by the diode.

The invention also includes a digital voltmeter or other measuring instrument provided with an A.C. to D.C. converter circuit in accordance with any of the preceding statements of invention.

Figure 2:
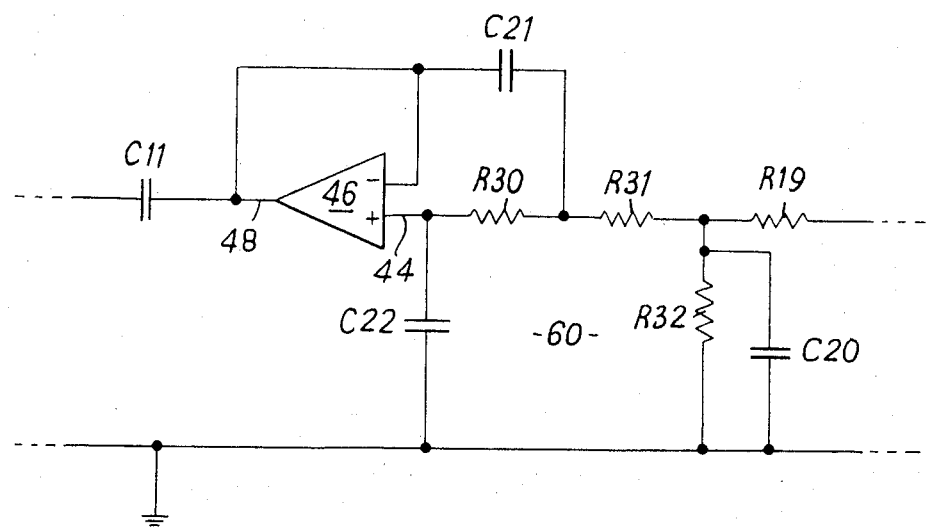

The invention will now be described, by way of non-limitative example only, with reference to the accompanying drawings of which:

FIG. 1 is a part-schematic circuit diagram of an A.C. to D.C. converter circuit in accordance with the present invention; and FIG. 2 is a circuit diagram of an alternative embodiment of a part of the circuit of FIG. 1.

The A.C. to D.C. converter circuit shown in FIG. 1 is generally indicated at 10, and is intended for measuring the amplitude of a sinusoidal A.C. signal produced by an A.C. voltage source 12. The A.C. signal may typically have a frequency of up to 300 MHz and an amplitude of a few millivolts.

The circuit 10 comprises a high input impedance, unity gain buffer amplifier 14 whose input 16 is connected to receive the A.C. voltage produced by the source 12. The buffer amplifier 14 may conveniently be mounted in a probe (not shown), and has an output 18 connected, via a coaxial cable 20 in series with a bias resistor R1, to a negative power supply rail 22. A capacitor C1 is connected between earth and the junction between the resistor R1 and the negative supply rail 22. The buffer amplifier 14 thus receives its power supplies via the cable 20.

The end of the cable 20 remote from the buffer amplifier 14 is A.C. coupled via a capacitor C2 to the base of an NPN transistor TR1 having a base bias resistor R2. The transistor TR1 is one of a matched pair of transistors TR1 and TR2, which are connected together in a long-tailed pair configuration. The common emitters of the transistors TR1, TR2 are connected to a common reservoir capacitor C3, and to the negative supply rail 22 via a bias resistor R3, while their collector circuits include respective de-coupling capacitors C4 and C5, and respective load resistors R4 and R5 which are nominally equal in value and connected to the opposite ends of a potentiometer RV1. The potentiometer RV1 has an adjustable wiper 24 which is connected to a positive power supply rail 26.

The collectors of the transistors TR1, TR2 are respectively connected to the two inputs 28, 30 of a high gain differential amplifier 32, which may conveniently form part of an integrated circuit. The amplifier 32 has an output 34 which is connected, via a feedback capacitor C6, to the input 28 and, via a diode D1 and a resistor R6 in series, to the wiper 36 of a potentiometer RV2. The potentiometer RV2 is connected in turn between the supply rails 22, 26.

The junction of the diode D1 and the resistor R6 is connected, via a resistor R7 and a variable resistor RV3 in series, to a terminal 38 which constitutes the output terminal of the circuit 10. A bias resistor R8 is connected between the supply rail 22 and the junction of the diode D1 and the resistor R6, while a further bias resistor R9 is connected between this junction and earth.

Also connected to the junction of the diode D1 and the resistor R6, via a resistor R10, is the collector of an NPN transistor TR3, which is arranged in the grounded-emitter configuration and constitutes part of a chopper circuit 39. The base of the transistor TR3 is connected, via a bias resistor R11, to the positive supply rail 26 and, via a capacitor C7, to the output 40 of an astable circuit 42.

The astable circuit 42 comprises two NPN transistors TR4 and TR5 whose emitters each include a respective bias resistor R12, R13 and are connected together via a capacitor C8. The base of the transistor TR5 is connected to the junction of two resistors R14 and R15, which are connected in series between earth and the negative supply rail 22, while the base of the transistor TR4 is connected to the supply rail 22 via a bias resistor R16. The collector of the transistor TR5 includes a variable load resistor RV4, and is connected to the base of the transistor TR4 by a resistor R17, while the collector of the transistor TR4 includes a load resistor R18 and constitutes the output 40 of the astable circuit 42.

The astable circuit 42 has a typical fixed operating frequency of 10 kHz.

The collector of the chopper transistor TR3 is connected via a resistor R19 to the input 44 of a high gain amplifier 46, which may conveniently form a further part of the integrated circuit containing the amplifier 32. The amplifier 46 has an output 48, and a feedback network in the form of a bridged-T filter 50, which has a resonant frequency substantially equal to the operating frequency of the astable circuit 42. The filter 50 comprises two equal resistors R20, R21 connected in series between the output 48 and the input 44 of the amplifier 46, a capacitor C9 in parallel with both of these resistors, and a further capacitor C10 connected between the junction of the resistors R20, R21 and earth. The output 48 of the amplifier 46 is coupled via a capacitor C11 to the base of the transistor TR2.

The base of the transistor TR2 is also connected to earth via a resistor R22, to the output 34 of the amplifier 32 via a resistor R23 in parallel with a diode D2, and to the wiper 52 of a potentiometer RV5 via a resistor R24. The potentiometer RV5 is connected between earth and the negative supply rail 22.

The circuit 10 is normally used in conjunction with a digital voltmeter or similar measuring instrument: the output terminal 38 of the circuit 10 is therefore shown connected to the input 54 of a digital voltmeter 56.

In accordance with one method of setting up the circuit 10 for use, the potentiometer RV4 is adjusted until the operating frequency of the astable circuit 42 is substantially equal to the resonant frequency of the filter 50. The diode D1 is then temporarily reverse-biassed (e.g. by unbalancing the transistors TR1 and TR2 by adjustment of the potentiometer RV1), while the potentiometer RV2 is adjusted to produce a zero reading on the digital voltmeter 56: this corresponds to a minimum amplitude sinusoidal signal at the base of the transistor TR2. With the input 16 to the buffer amplifier 14 open circuit, the wiper 52 of the potentiometer RV5 is then set to its mid-range position and the potentiometer RV1 is adjusted to again provide a zero reading on the digital voltmeter 56. Finally, an A.C. reference signal of known amplitude is applied to the input 16 of the buffer amplifier 14, and the potentiometer RV3 is adjusted for calibration purposes, i.e. to give the required reading on the digital voltmeter 56.

In operation, the sinusoidal A.C. signal whose amplitude is to be measured is applied to the input 16 of the buffer amplifier 14, which acts as an impedance transformer and transmits the signal, without voltage amplification, over the cable 20 to the capacitor C2. The values of the resistors R1 and R2 are selected, inter alia, to provide matching for the impedance of the cable 20. The signal is then transmitted via C2 to the base of the transistor TR1, the base-emitter junction of which acts as a rectifier to charge the reservoir capacitor C3.

The rectified signal on C3 is considerably amplified by the transistor TR1, and the rectified and amplified signal at the collector of the transistor TR1 is applied to the input 28 of the differential amplifier 32: this signal contains an appreciable amount of ripple, which is suppressed by the capacitor C4 and further suppressed by the feedback capacitor C6.

The amplifier 32 produces at its output 34 a D.C. signal which is applied via the diode D1 to the collector of the transistor TR3 in the chopper circuit 39. The signal at the collector of the transistor TR3 is thus a 10 kHz square wave, whose amplitude is dependent upon the amplitude of the original A.C. signal. This chopped signal is applied to the amplifier 46 and its feedback filter 50, which together transmit the fundamental 10 kHz sinusoidal component of the square wave but substantially attenuate all the higher harmonics: typically only about 3% of the next harmonic component of the square wave (the third harmonic) is transmitted.

The signal at the output 48 of the amplifier 46 is therefore substantially similar in waveform to the original A.C. signal, and is applied to the base of the transistor TR2 via the capacitor C11. The transistor TR2 rectifies the signal from the amplifier 46 in a similar manner to that described with reference to the transistor TR1, and the rectified signal at the collector of the transistor TR2 is applied to the other input 30 of the differential amplifier 32.

The differential amplifier 32 balances the two signals at its inputs 28, 30 by way of the feedback loop including the chopper transistor TR3 and the filter 50/amplifier 46. However, since the transistors TR1 and TR2 are a matched pair, their rectifying characteristics (including the temperature dependence of their respective base-emitter voltages) are closely similar: the amplitudes of the signals on their respective bases must therefore also be substantially the same, particularly as these signals have substantially similar waveforms. But the amplitude of the signal on the base of the transistor TR2 is linearly related to the voltage of the D.C. signal which is chopped by the chopper transistor TR3. Hence, the differential amplifier 32 produces at its output 34 a D.C. output signal whose voltage is substantially linearly related to the amplitude of the original A.C. signal. In the illustrated embodiment of the invention, this signal is fed via R7 and RV3 to the output terminal 38, where it is measured as a current by the digital voltmeter 56: however, if desired a voltage signal could be taken, e.g., from an adjustable tapping on the resistor R9.

The diode D1 serves to prevent the voltage of the signal applied to the collector of the chopper transistor TR3 becoming negative by more than a small amount, since this would result in positive feedback and consequent latching the circuit 10 in an inoperative mode.

Additionally, the bias network including the resistors R6, R8, R9 and RV2 ensure that when the diode D1 is reverse-biassed by a negative voltage at the output 34 of the amplifier 32 (which negative voltage may be produced by an unbalance between the transistors TR1 and TR2), there is nevertheless a small negative "offset" voltage at the junction of the diode D1 and the resistor R7. This offset voltage produces a negative reading on the digital voltmeter 56, and thus indicates that zero-setting is required.

The resistors R22 and R23 limit the overall D.C. gain of the transistors TR1, TR2 and the amplifier 32 to a value at which the small negative offset voltage is insufficient to cause the aforementioned latching of the circuit 10, while the diode D2 limits the magnitude of any negative voltage excursion at the output 34 of the amplifier 32.

It will be appreciated that several modifications may be made to the described embodiments of the invention. For example, the transistors TR1 and TR2 and their associated circuitry could be replaced by respective simple diode rectifiers, while the astable circuit 48 and the chopper transistor TR3 could be replaced by some other suitable chopper circuit, for example a circuit including a relay driven at a predetermined fixed frequency. Also, the filter 50 could advantageously be replaced by a low pass filter whose pass band extends to a frequency just above the operating frequency of the chopper circuit.

Such a low pass filter is shown at 60 in FIG. 2, where parts similar to those of FIG. 1 are given the same reference numerals as were used in FIG. 1. The filter 60 comprises two equal resistors R30, R31 connected in series between the resistor R19 and the input 44 of the amplifier 46, a resistor R32 and a capacitor C20 connected, in parallel with each other, between earth and the junction of R19 and R31, a capacitor C21 connected between the output 48 of the amplifier 46 and the junction of R30 and R31, and a capacitor C22 connected between earth and the input 44 of the amplifier 46.

Moreover a substantial proportion of the compensation for the rectifying characteristics of the transistors TR1 and TR2 could still be achieved if the filter 50 and the amplifier 46 were omitted altogether, since the amplitude of the signal applied to the base of TR2 is more important than the waveform thereof.

Finally, A.C. to D.C. converter circuits in accordance with the present invention may be used for purposes other than the measurement of A.C. voltages, for example in the control of such voltages.

I claim:

1. An A.C. to D.C. converter circuit for producing a D.C. output signal whose magnitude is dependent upon the amplitude of an A.C. input signal, the circuit comprising:

first rectifying means for rectifying the A.C. input signal;

differential amplifier means having first and second inputs, the first input being connected to receive the rectified signal produced by the first rectifying means, and the differential amplifier being arranged to produce the D.C. output signal;

a chopper circuit connected to the output of the differential amplifier means;

and second rectifying means, similar in its rectifying characteristics to the first rectifying means, connected to receive and rectify the chopped signal produced by the chopper circuit, the output of the second rectifying means being connected to the second input of the differential amplifier means, whereby to substantially compensate for the effects of the nonlinear effects introduced by the characteristics of the rectifying means and render the relationship between the amplitude of the A.C. input signal and the magnitude of the D.C. output signal substantially linear.

2. A converter circuit as claimed in claim 1, wherein there is provided filter means connected between the chopper circuit and the second rectifying means and arranged to render the waveform of the chopped signal substantially similar to the waveform of the A.C. input signal.

3. A converter circuit as claimed in claim 2, wherein the filter means comprises a tuned filter whose resonant frequency is substantially equal to the operating frequency of the chopper circuit.

4. A converter circuit as claimed in claim 2, wherein the filter means comprises a low pass filter whose pass band extends to a frequency just above the operating frequency of the chopper circuit.

5. A converter circuit as claimed in claim 1, wherein the chopper circuit comprises a semi-conductor switch and means for driving the switch at a predetermined fixed frequency.

6. A converter circuit as claimed in claim 5, wherein the means for driving the switch comprises an astable multivibrator circuit.

7. A converter circuit as claimed in claim 1, wherein the first and second rectifying circuits respectively comprise first and second transistors having their emitters commoned and connected to a common reservoir capacitor, the respective rectified outputs of the rectifying circuits being taken from the respective collectors of the transistors.

8. A converter circuit as claimed in claim 1, wherein there is provided at least one diode arranged to limit the voltage supplied to the chopper circuit from the differential amplifier means, so as to prevent positive feed-back around the loop including the chopper circuit and the second rectifying means.

9. A converter circuit as claimed in claim 8, wherein there is provided a biassing arrangement for producing a small offset in the D.C. output signal when the diode is reverse-biassed, whereby to indicate that the voltage supplied to the chopper circuit has been limited by the diode.

* * * * *